United States Patent

Flisch

[11] 4,058,035
[45] Nov. 15, 1977

[54] AUTOMATIC LATHE
[75] Inventor: Hermann Flisch, Eichholz, Switzerland
[73] Assignee: Eunipp AG., Zug, Switzerland
[21] Appl. No.: 701,123
[22] Filed: June 30, 1976
[51] Int. Cl.$^2$ .................. B23B 3/24; B23B 3/00; B23P 23/00
[52] U.S. Cl. .............................. 82/3; 82/2 B; 29/38 B
[58] Field of Search .............. 82/2 R, 2 B, 3, 2.5; 29/37 A, 38 A, 38 B

[56] References Cited
U.S. PATENT DOCUMENTS

| | | | |
|---|---|---|---|
| 2,128,186 | 8/1938 | Jones | 29/38 B |
| 2,473,306 | 6/1949 | Schreiber | 82/3 |
| 2,779,956 | 2/1957 | Butler et al. | 29/38 B |
| 3,693,485 | 9/1972 | Maurer | 82/3 |
| 3,978,565 | 9/1976 | Flisch | 29/38 B |
| 3,979,985 | 9/1976 | Daniels | 82/3 |
| 3,990,133 | 11/1976 | Schalles | 82/3 |

FOREIGN PATENT DOCUMENTS

| | | | |
|---|---|---|---|
| 1,259,674 | 1/1968 | Germany | 29/37 A |

Primary Examiner—Harrison L. Hinson

[57] ABSTRACT

The invention relates to an automatic lathe for machining workpieces in the form of bars or pressings and capable of carrying out machining operations on these workpieces additional to those that are nominally possible.

3 Claims, 8 Drawing Figures

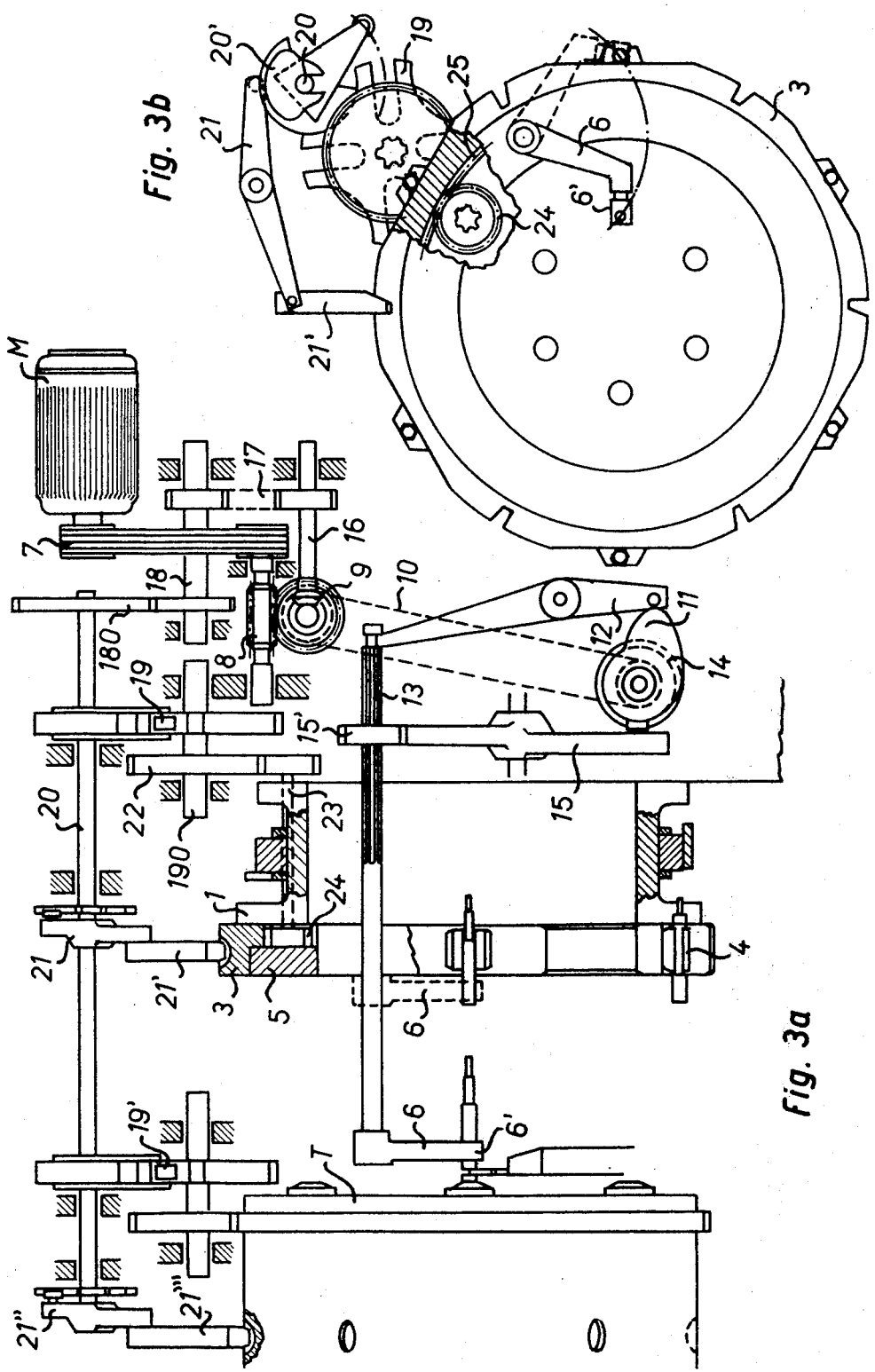

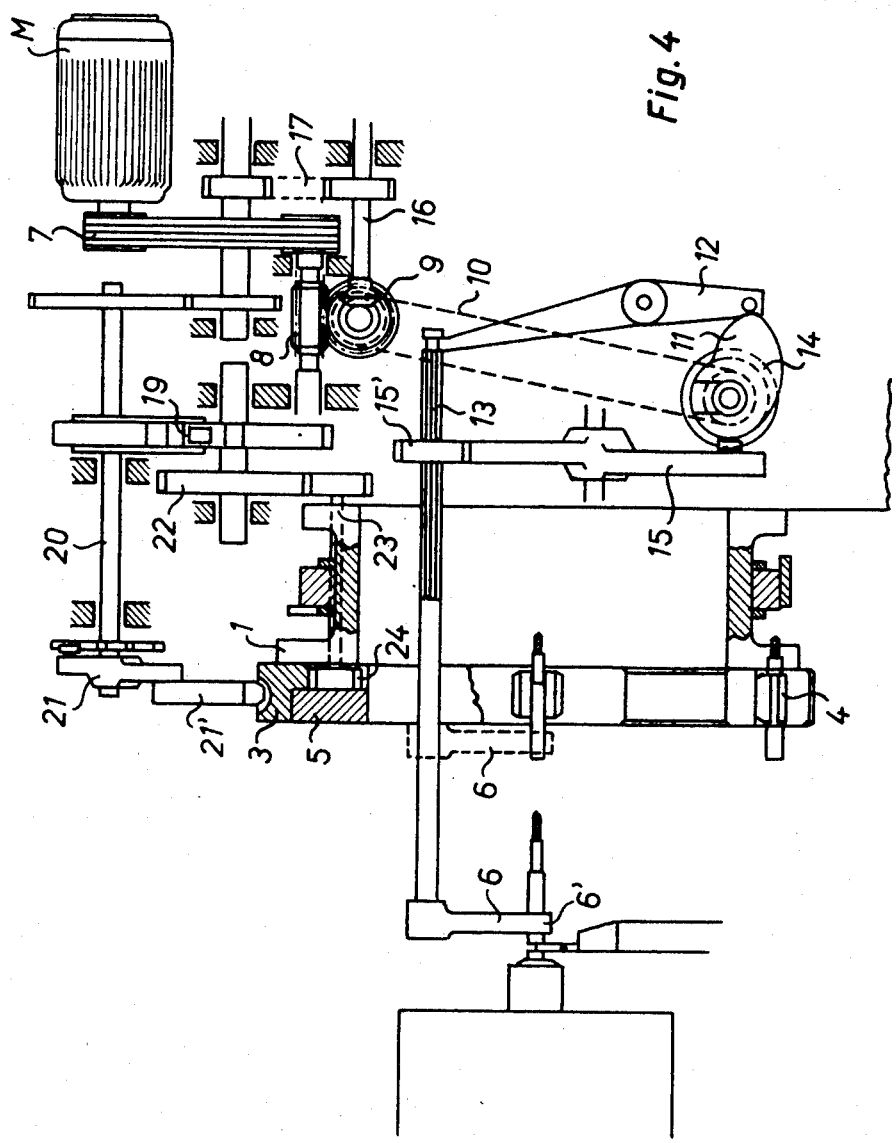

AUTOMATIC LATHE

Multi-spindle and single-spindle automatic lathes of the known kind are capable of carrying out operations which depend upon the number of working stations provided. The production of workpieces that require operations exceeding the number of tool spindles on the machine, is however not easily achieved. Means are therefore required that enable further machining operations to be carried out on the automatic lathe in order to complete the machining of a workpiece.

Devices are known which, after a workpiece has been machined in an automatic lathe, permits the workpiece to be moved to a machining station outside the automatic machine by means of a grab or the like. Such further machining operations suffer from the disadvantage that the throughput rate is greatly reduced by the need for moving the workpieces into the working station. This arrangement also causes difficulties regarding the accessibility of the space in which the work on the automatic lathe is carried out.

Other devices are known which are disposed in the machining zone of the automatic lathe, but these render the automatic lathe difficult of access and limit the number and type of additional machining operations that can be carried out.

The object of the present invention is to avoid these disadvantages.

The automatic lathe in accordance with the invention is characterized by an additional machining apparatus which consists of a workpiece carrier and machining elements co-operating therewith, and in that the device is arranged outside that zone of the automatic lathe in which the previous machining operations have been carried out.

Figure 1B:
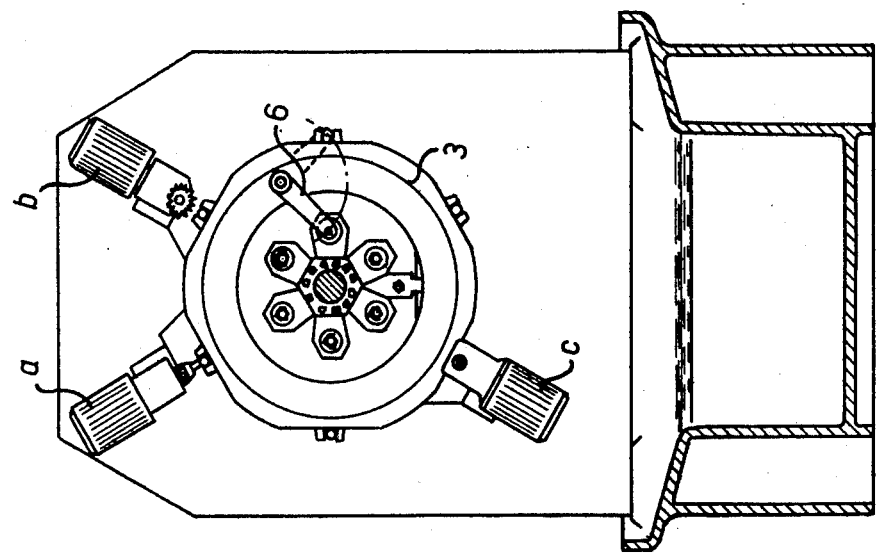
Figure 1A:
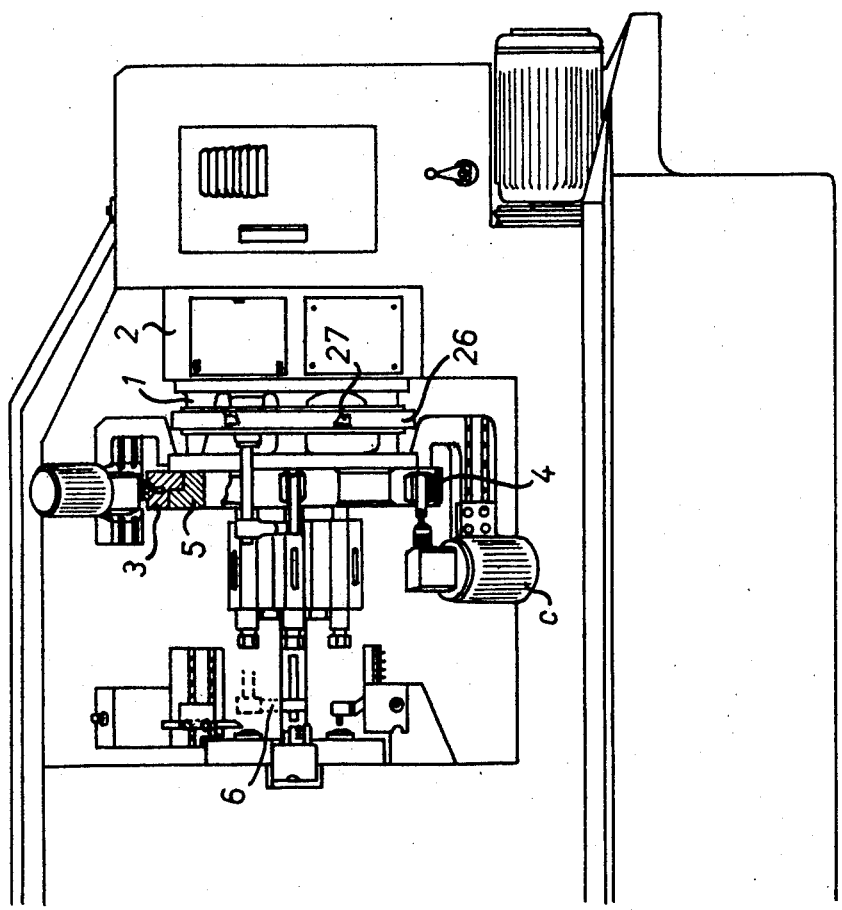
Figures 2A, 2B, 2C:
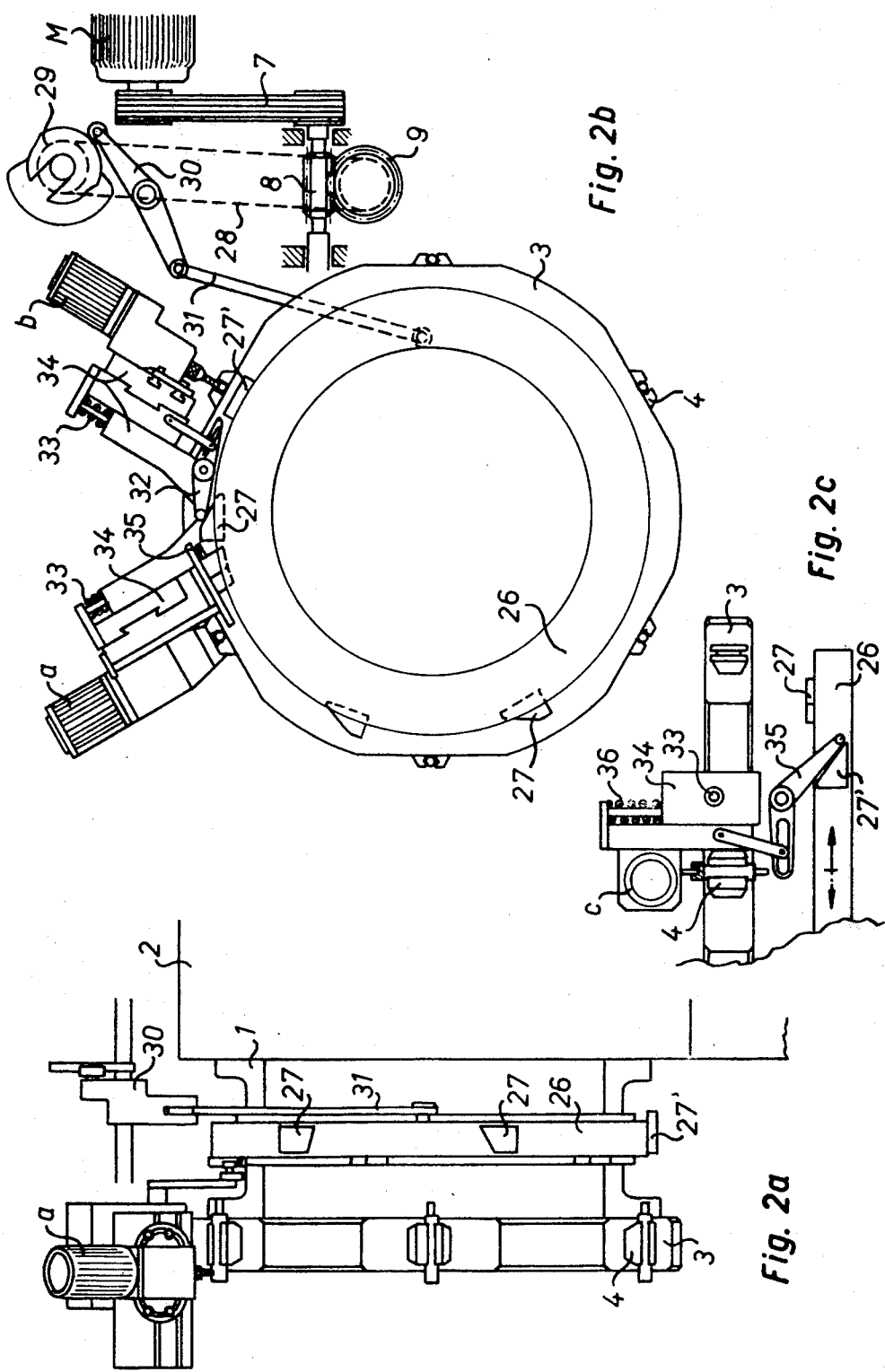

Two forms of the automatic lathe in accordance with the invention are illustrated in the annexed drawings, in which:

FIG. 1a is a side view of a multi-spindle automatic lathe with the additional machining apparatus, FIG. 1b is a cross-section through the automatic lathe with a view of the additional machining apparatus, FIG. 2a shows the additional machining apparatus on a larger scale, FIG. 2b shows the same apparatus with its drive mechanism, FIG. 2c shows a portion of a radial view of the apparatus, FIG. 3a shows the drives for the automatic lathe, the workpiece carrier and the grab for the workpieces, FIG. 3b illustrates details of the drive for the workpiece carrier, and FIG. 4 shows the same details as in FIG. 3a, in the case of a single-spindle automatic lathe.

The multi-spindle automatic lathe, illustrated diagrammatically in FIG. 1a, has for example three additional machining units a, b and c, which increase the number of possible machining operations that can be carried out on the automatic lathe beyond that associated with the number of spindles. These additional machining units a, b and c are arranged on a support 1 which is firmly connected to a stand 2 of the automatic lathe. Positioned in front of this support 1 is a workpiece carrier 3 which can be rotated stepwise and is indexable and which carries workpiece chucks 4. A guide ring 5 is positioned within the workpiece carrier 3.

The machining units a and b are displaceable radially of the workpeice carrier 3 for example, and the machining unit c is displaceable, for example, parallel to the axis of rotation of the workpiece carrier 3. The drives required for this purpose will now be described.

In order to enable a workpiece, that, by the rotary stepwise action of the spindle drum T, has been carried from one machining station to the next and finally to the last station, to be moved from this last station to the workpiece carrier 3, there is provided a transfer device in the form of a grab 6. This grab 6, which incorporates tongs 6' of a known kind and is therefore not illustrated in detail, is driven by a motor M as shown in FIG. 3a; the longitudinal displacement of the grab 6 as well as its swinging movement towards and away from the axis of the workpiece to be transferred, i.e. towards and away from the axis of the spindle of the last machining station, are derived from the spindle drum. The motor M drives a worm 8 and therefore a wormwheel 9 through a V-belt 7. A cam-disc 11 is driven by the worm-wheel through a chain drive 10. One end of a lever 12 probes the cam-disc 11 which is mounted off-centre; in so doing, the lever executes a swinging movement which by way of the other, free end of the lever imparts a reciprocatory movement to shaft 13, the guide means for which are shown in some detail. At one of its ends this shaft is connected to said end of the lever 12, and at its other end the shaft carries the grab 6 which therefore, because of the axial displacement of the shaft 13, executes a reciprocatory movement between the spindle drum and the workpiece carrier 3.

Mounted coaxially with the cam-disc 11 is a cam-plate 14. This actuates a toothed sector 15, which turns in a plane at right-angles to the plane in which the lever 12 swings. That end of the toothed sector 15 remote from the cam-plate 14 meshes with a gear wheel 15' which is mounted on a splined portion of the above-mentioned shaft 13. Suitable choice of the cam-disc 11 and the cam-plate 14 and appropriate setting of these parts results in the grab 6 executing a swinging movement upon completion of each axial movement.

As previously mentioned, the workpiece carrier 3 can be rotated stepwise and is indexable. The drive required for indexing is likewise provided by the motor M and is picked up by the shaft of the above-mentioned worm-wheel 9. Through a first gear 17, a bevel gear 16 transmits the rotary movement of the shaft to a shaft 18 which drives a gear 180. The latter drives a shaft 20 carrying a Maltese-cross transmission 19.

The shaft 20 serves to drive said Maltese-cross transmission 19 for the stepping movement of the workpiece carrier 3, as well as to drive a similar Maltese-cross transmission 19' for effecting the stepwise rotary movement of the spindle drum T (see FIG. 3a). A swivel lever 21 is actuated at one of its ends by a cam disc 20', and at its other end the swivel lever moves the index 21' for indexing the workpiece carrier 3. A similar drive, 21", 21"' on the shaft 20 serves for indexing the spindle drum T.

The Maltese-cross transmission 19, provided for the stepwise rotation of the workpiece carrier 3, drives a shaft 190, and the latter, through a gear 22, drives a shaft 23 on which is mounted a pinion 24. The pinion 24 meshes with an annular gear 25 (FIG. 3b) in the workpiece carrier 3.

The common drive for indexing and stepwise rotation results in the necessary synchronization of the movements.

To enable the workpieces, passed by the grab 6 to the carrier, to be machined, the machining units a, b and c can be displaced radially and/or axially and controlled accordingly.

For this purpose, use is made of a cam-carrier 26 (FIGS. 2a to 2c) which is mounted coaxially with the workpiece carrier 3 and which carries cams 27 and 27'. The cam-carrier executes a reciprocatory rotary movement; the drive for this is provided through the shaft of the previously-mentioned worm-gear 9 (FIG. 2b) and by way of a chain drive 28 which powers a cam-drive 29. The intermittent rotary drive of the cam-carrier 26 is then provided by way of a lever 30 and an arm 31.

Cams 27, the shape of which can be seen from FIG. 2b, serve to effect radial displacement of the units a and b for example. These cams are provided on the cam-carrier 26. A probe lever 32 probes the shape of the cams and moves the slide group 34 on which the machining unit is mounted and which consists of a stationary part and a part displaceable relatively thereto and is provided with a return spring 33.

Radial displacement takes place in a similar manner with the aid of the cams 27' which are likewise provided on the cam-carrier 26; the shape of these cams is shown in FIG. 2c. A lever system 35 probes these cams and as it swings it displaces those parts of the slide group 24 that are fitted in a dovetail channel (see units a and b) in the radially displaceable part. Generally, only one or the other drive, i.e. the radial or the axial, will be provided in the case of one machining unit; however both can be provided at the same time as indicated by the radially acting return spring 33 in the case of the unit c.

In principle, as shown in FIG. 4, a single-spindle automatic lathe can also be equipped with the illustrated carrier and transfer device. A detail that should be mentioned is that the shaft 20 only drives the Maltese-cross transmission 19 and terminates at the lever 21 since the Maltese-cross transmission 19' and the parts 21" and 21''' are dispensed with in the case of a single-spindle automatic lathe.

I claim:

1. A multispindle automatic lathe comprising a stand, a rotatable spindle drum supported thereby and further supporting a plurality of spindles and indexable in stepwise rotation from one working station to the next for carrying out a number or machining operations by means of tools associated with said spindle drum, a support opposite the stand and carrying machining means capable of carrying out machining operations additional to those performed with the tools associated with the spindle drum, said machining means receiving workpieces from the spindle drum from a transfer device operatively feeding the same and being disposed outside of a zone occupied by said tools and comprising a workpiece carrier disposed coaxially with the axis of the spindle drum and rotatable in synchronism with same.

2. A lathe according to claim 1, wherein the workpiece carrier is provided with a rotary stepping drive and the machining means are provided with a further drive for displacing the same in relation to the workpiece carrier, said rotary stepping drive being synchronized, through a common shaft, with said further drive.

3. A lathe according to claim 2, wherein a circular camcarrier is disposed coaxially with the workpiece carrier and is provided with cams for controlling the displacement of the machining means.

* * * * *